United States Patent
Yoon et al.

(10) Patent No.: US 11,398,874 B2
(45) Date of Patent: Jul. 26, 2022

(54) METHOD AND APPARATUS FOR MEASURING SIGNAL QUALITY IN WIRELESS COMMUNICATION SYSTEM

(71) Applicant: LG ELECTRONICS INC., Seoul (KR)

(72) Inventors: Sukhyon Yoon, Seoul (KR); Kijun Kim, Seoul (KR); Hyunsoo Ko, Seoul (KR); Eunsun Kim, Seoul (KR); Sangwon Kim, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 16/768,047

(22) PCT Filed: Nov. 29, 2018

(86) PCT No.: PCT/KR2018/014957
§ 371 (c)(1),
(2) Date: May 28, 2020

(87) PCT Pub. No.: WO2019/107969
PCT Pub. Date: Jun. 6, 2019

(65) Prior Publication Data
US 2021/0175985 A1 Jun. 10, 2021

Related U.S. Application Data

(60) Provisional application No. 62/592,327, filed on Nov. 29, 2017.

(51) Int. Cl.
*H04B 17/309* (2015.01)
*H04W 24/10* (2009.01)

(52) U.S. Cl.
CPC .......... *H04B 17/309* (2015.01); *H04W 24/10* (2013.01)

(58) Field of Classification Search
CPC ............................ H04B 17/309; H04W 24/10
See application file for complete search history.

(56) References Cited

U.S. PATENT DOCUMENTS

| | | | |
|---|---|---|---|
| 2018/0139036 A1* | 5/2018 | Islam | H04L 27/2614 |
| 2019/0149305 A1* | 5/2019 | Zhou | H04L 5/0055 370/330 |
| 2019/0222368 A1* | 7/2019 | Yang | H04L 5/0094 |
| 2019/0223124 A1* | 7/2019 | Tang | H04W 56/001 |
| 2019/0327650 A1* | 10/2019 | Yiu | H04W 36/0085 |
| 2020/0053583 A1* | 2/2020 | Määttänen | H04W 24/10 |
| 2020/0275451 A1* | 8/2020 | Liu | H04L 5/0048 |

(Continued)

FOREIGN PATENT DOCUMENTS

WO 2017150888 9/2017

OTHER PUBLICATIONS

PCT International Application No. PCT/KR2018/014957, Written Opinion of the International Searching Authority dated Mar. 20, 2019, 19 pages.

(Continued)

*Primary Examiner* — Zhiren Qin
(74) *Attorney, Agent, or Firm* — Lee Hong Degerman Kang Waimey

(57) ABSTRACT

Disclosed are a method and an apparatus for measuring signal quality in a wireless communication system.

12 Claims, 7 Drawing Sheets

(56) References Cited

U.S. PATENT DOCUMENTS

2020/0288508 A1* 9/2020 Shi .................... H04W 74/0833
2021/0167930 A1* 6/2021 Jeon .................... H04L 27/2607

OTHER PUBLICATIONS

Huawei, HiSilicon, et al., "BWP impact on CSI-RS based RRM measurement," 3GPP TSG-RAN WG2 #100, R2-1712560, Dec. 2017, 2 pages.

Samsung, "Scenarios of Measurement Gap Considering Bandwidth Part," 3GPP TSG-RAN WG2 #100, R2-1713845, Dec. 2017, 5 pages.

Intel Corporation, "Overall impact in RAN2 for BWP," 3GPP TSG-RAN WG2 #100, R2-1712646, Dec. 2017, 6 pages.

3rd Generation Partnership Project (3GPP), "Technical Specification Group Radio Access Network; NR; Radio Resource Control (RRC); Protocol specification (Release 15)," 3GPP TS 38.331 V0.2.0, Nov. 2017, 154 pages.

* cited by examiner

METHOD AND APPARATUS FOR MEASURING SIGNAL QUALITY IN WIRELESS COMMUNICATION SYSTEM

CROSS-REFERENCE TO RELATED APPLICATIONS

This application is the National Stage filing under 35 U.S.C. 371 of International Application No. PCT/KR2018/014957, filed on Nov. 29, 2018, which claims the benefit of U.S. Provisional Application No. 62/592,327, filed on Nov. 29, 2017, the contents of which are all hereby incorporated by reference herein in their entirety.

TECHNICAL FIELD

The present disclosure relates to a wireless communication system, and more particularly, to a method and apparatus for measuring signal quality

BACKGROUND ART

As many more communication devices have required higher communication capacity, the necessity of the enhanced mobile broadband (eMBB) communication much improved than the legacy radio access technology (RAT) has increased. In addition, massive machine type communication (mMTC) capable of providing various services at anytime and anywhere by connecting a number of devices or objects to each other has been considered in the next generation communication system.

Moreover, a communication system design capable of supporting services/UEs sensitive to reliability and latency has been discussed. The introduction of the next generation RAT considering the eMBB communication, mMTC, Ultra-reliable and low latency communication (URLLC), and the like has been discussed.

DISCLOSURE

Technical Problem

The object of the present disclosure is to provide a method of measuring the reception quality of a cell more efficiently.

Another object of the present disclosure is to provide a method of reducing overhead in measuring the reception quality of a cell.

A further object of the present disclosure is to provide a method of reducing the number of times that measurement is unnecessarily performed in a new radio access technology (NR) system where a plurality of synchronization signal blocks (SSBs) are transmitted.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of measuring signal quality by a communication device in a wireless communication system. The method may include receiving information on a plurality of frequencies for synchronization signal block (SSB) transmission and, when a first bandwidth part (BWP) among a plurality of BWPs configured for the communication device is activated and the first BWP includes at least one frequency among the plurality of frequencies, measuring the signal quality based on at least one SSB transmitted at the frequency included in the first BWP.

According to an embodiment, receiving the information on the plurality of frequencies may include receiving a radio resource control (RRC) configuration message including measurement object information, and the measurement object information may include the information on the plurality of frequencies.

According to an embodiment, measuring the signal quality may include measuring at least one of reference signal received power (RSRP) and reference signal received quality (RSRQ) based on the at least one SSB transmitted at the frequency included in the first BWP.

According to an embodiment, when a BWP activated for the communication device is switched from the first BWP to a second BWP and the second BWP includes at least one frequency among the plurality of frequencies, a measurement result obtained based on an SSB transmitted at the frequency included in the second BWP among the plurality of frequencies and a measurement result obtained based on the SSB transmitted at the frequency included in the first BWP may be determined as a measurement result based on an SSB transmitted at the same frequency.

According to an embodiment, measuring the signal quality may include obtaining a value representing the signal quality by combining signal quality values measured based on the at least one SSB transmitted at the frequency included in the first BWP.

According to an embodiment, the value representing the signal quality may include an average or a maximum value of the signal quality values measured based on the at least one SSB transmitted at the frequency included in the first BWP.

According to an embodiment, the method may further include reporting measurement information on the signal quality.

In another aspect of the present disclosure, provided herein is a communication device for measuring signal quality in a wireless communication system. The communication device may include a memory and a processor. The processor may be configured to receive information on a plurality of frequencies for synchronization signal block (SSB) transmission and, when a first bandwidth part (BWP) among a plurality of BWPs configured for the communication device is activated and the first BWP includes at least one frequency among the plurality of frequencies, measure the signal quality based on at least one SSB transmitted at the frequency included in the first BWP.

Advantageous Effects

According to the present disclosure, the reception quality of a cell may be efficiently measured in a wireless communication system.

In addition, it is possible to reduce overhead in measuring the reception quality of a cell.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
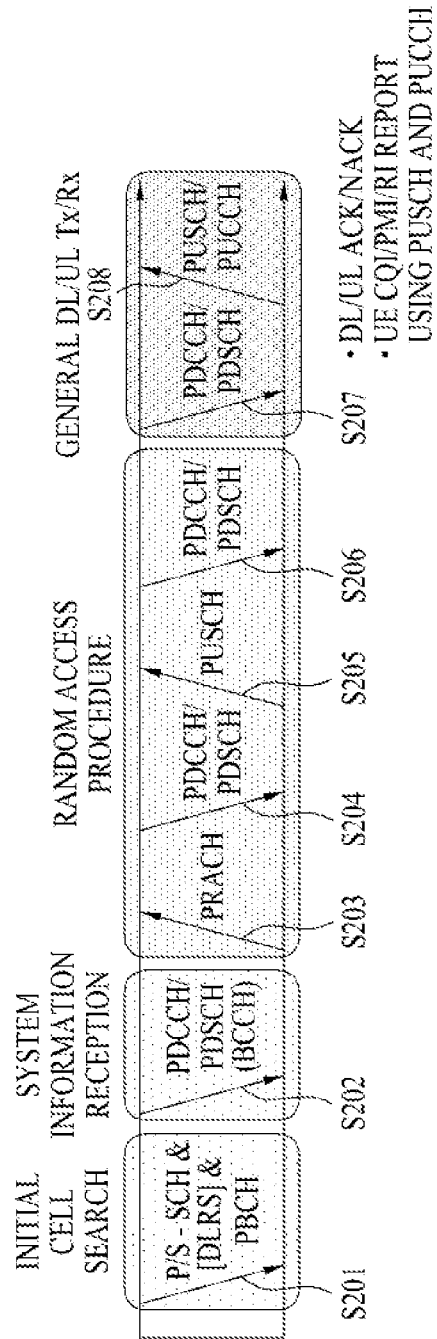
FIG. 1 is a view illustrating physical channels and a general signal transmission method using the physical channels in a 3GPP system.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

The detailed description, which will be given below with reference to the accompanying drawings, is intended to explain exemplary embodiments of the present disclosure, rather than to show the only embodiments that can be implemented according to the disclosure.

Although the terms used in the present disclosure are selected from generally known and used terms while considering functions of the present disclosure, they may vary according to intention or customs of those skilled in the art or emergence of new technology. Some of the terms mentioned in the description of the present disclosure may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present disclosure described hereinbelow are combinations of elements and features of the present disclosure. The elements or features may be considered selective unless mentioned otherwise. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the description of the attached drawings, a detailed description of known procedures or steps of the present disclosure will be avoided least it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present disclosure (more particularly, in the context of the following claims) unless indicated otherwise in the specification or unless context clearly indicates otherwise.

Terms to be used in this application are defined as follows.

In the following description, a user equipment (UE) may be a fixed or mobile user equipment (UE), and may be any one of various devices that transmit and receive user data and/or various kinds of control information by communicating with a base station (BS). The UE may be referred to as a Terminal Equipment, Mobile Station (MS), Mobile Terminal (MT), User Terminal (UT), Subscriber Station (SS), wireless device, Personal Digital Assistant (PDA), wireless modem, or handheld device.

In the following description, a Base Station (BS) is a fixed station that generally communicates with a UE or another BS. The BS communicates with a UE or another BS to exchange various kinds of data and control information with a UE or another BS. The BS may be referred to as an Advanced Base Station (ABS), Node-B (NB), evolved-NodeB (eNB), Base Transceiver System (BTS), Access Point (AP), or Processing Server (PS). Specifically, a base station (BS) of UTRAN will hereinafter be referred to as Node-B, a base station (BS) of E-UTRAN will hereinafter be referred to as eNB, and a base station (BS) of a new radio access technology network will hereinafter be referred to as gNB.

Techniques, devices, and systems described herein can be used in various wireless multiple access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), Multi-Carrier Frequency Division Multiple Access (MC-FDMA), etc.

CDMA may be implemented as a radio technology such as Universal Terrestrial Radio Access (UTRA) or CDMA2000. TDMA may be implemented as a radio technology such as Global System for Mobile communication (GSM), General Packet Radio Service (GPRS), and Enhanced Data Rates for GSM Evolution (EDGE). OFDMA may be implemented as a radio technology such as Institute of Electrical and Electronics Engineers (IEEE) 802.11 (Wi-Fi), IEEE 802.16 (WiMAX), IEEE 802.20, Evolved-UTRA (E-UTRA), etc.

UTRA is a part of Universal Mobile Telecommunication System (UMTS) and 3rd Generation Partnership Project (3GPP) Long Term Evolution (LTE) is a part of Evolved UMTS (E-UMTS) using E-UTRA. 3GPP LTE employs OFDMA for downlink and SC-FDMA for uplink. LTE-A is an evolution of 3GPP LTE. For the sake of clarity, it is assumed that the present disclosure is applied to 3GPP communication systems, for example, LTE/LTE-A systems, NR (New Radio Access Technology) system, etc. However, the technical features of the present disclosure are not limited thereto. For example, while the following detailed description is given under the assumption that a 3GPP communication system is being used as a mobile communication system, the description is applicable to any other mobile communication system except for specific features inherent to the 3GPP LTE/LTE-A/NR systems.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals.

An RS is a signal with a predefined special waveform known to both a gNode B (gNB) and a UE, and may also be referred to as a pilot. For example, cell specific RS, UE-specific RS (UE-RS), positioning RS (PRS), and channel state information RS (CSI-RS) are defined as DL RSs.

The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal.

In the present disclosure, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

For the terms and techniques which are used herein but not specifically described, 3GPP LTE/LTE-A standard documents, for example, 3GPP TS 36.211, 3GPP TS 36.212, 3GPP TS 36.213, 3GPP TS 36.321 and 3GPP TS 36.331 may be referenced, and 3GPP NR standard documents, for example, 3GPP TS 38.211, 3GPP TS 38.212, 3GPP 38.213, 3GPP 38.214, 3GPP 38.215, 3GPP TS 38.321 and 3GPP TS 38.331 may also be referenced.

FIG. 1 illustrates physical channels and a general method for transmitting signals on the physical channels in the 3GPP system.

Referring to FIG. 1, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed. As described above, the introduction of the next generation RAT considering the enhanced mobile broadband communication, massive MTC, Ultra-reliable and low latency communication (URLLC), and the like has been discussed. In the current 3GPP, many developers and companies are conducting intensive research into the next generation mobile communication system after EPC. The next generation mobile communication system after EPC may be referred to as a new RAT (NR) system, a 5G RAT system, or a 5G system. For convenience of description, the next generation mobile communication system after EPC will hereinafter be referred to as an NR system.

Higher and superior performances better than those of the legacy 4G system in terms of a data rate, capacity, latency, energy consumption, and energy costs should be supplied to the NR system. Therefore, it is necessary for the NR system to be significantly evolved in various fields, i.e., a bandwidth, spectral, energy, signaling efficiency, and cost-per-bit reduction.

The NR system may use the OFDM transmission scheme or other similar transmission methods. For example, the NR system may use numerologies shown in the following Table 1.

TABLE 1

| Parameter | Value |
| --- | --- |
| Subcarrier-spacing (Δf) | 60 kHz |
| OFDM symbol length | 16.33 us |
| Cyclic Prefix(CP) length | 1.30 us/1.17 us |
| System BW | 80 MHz |
| No. of available subcarriers | 1200 |
| Subframe length | 0.25 ms |
| Number of OFDM symbol per Subframe | 14 symbols |

As another example, the NR system may selectively use one among a plurality of OFDM numerologies shown below in Table 2.

TABLE 2

| Parameter | Value | Value | Value | Value |
| --- | --- | --- | --- | --- |
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix(CP) length | 5.20 us/ 4.69 us | 2.60 us/ 2.34 us | 1.30 us/ 1.17 us | 6.51 us/ 5.86 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

Referring to Table 2, OFDM numerologies having subcarrier spacings of 30, 60, and 120 kHz, which are multiples of 15 kHz, may be used based on a subcarrier spacing of 15 kHz used in the LTE system. The cyclic prefix (CP) length, system bandwidth (BW), number of available subcarriers, subframe length, and number of OFDM symbols per subframe, shown in Table 2, are merely examples and the present disclosure is not limited to the examples represented in Table 2. For example, for the 60 kHz subcarrier spacing, the system BW may be set to 100 MHz and the number of available subcarriers may have a value greater than 1500 and less than 1666.

The NR system may be based on OFDM parameters of the LTE system and other parameters. Alternatively, the NR system may be based on numerologies of the legacy LTE/LTE-A without change, and may have a larger system bandwidth (e.g., 100 MHz) as compared to the legacy LTE/LTE-A. In addition, the NR system may allow one cell to support a plurality of numerologies. That is, in the NR system, UEs operating in different numerologies may coexist in one cell.

In the 3GPP LTE/LTE-A system, a radio frame is 10 ms (307200 Ts) long, including 10 equal-size subframes (SFs). The 10 SFs of one radio frame may be assigned numbers. Ts represents a sampling time and is expressed as Ts=1/(2048*15 kHz). Each SF is 1 ms, including two slots. The 20 slots of one radio frame may be sequentially numbered from 0 to 19. Each slot has a length of 0.5 ms. A time taken to transmit one SF is defined as a transmission time interval (TTI). A time resource may be distinguished by a radio frame number (or radio frame index), an SF number (or SF index), a slot number (or slot index), and so on. A TTI refers to an interval in which data may be scheduled. In the current LTE/LTE-A system, for example, there is a UL grant or DL grant transmission opportunity every 1 ms, without a plurality of UL/DL grant opportunities for a shorter time than 1 ms. Accordingly, a TTI is 1 ms in the legacy LTE/LTE-A system.

Figure 2:
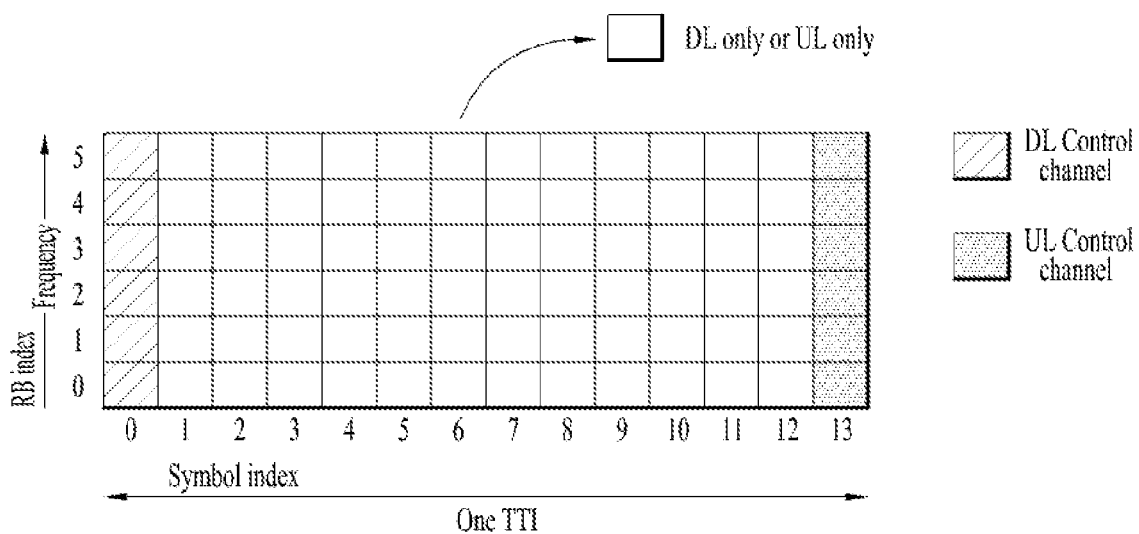
FIG. 2 is a view illustrating an exemplary slot structure available in new radio access technology (NR).

FIG. 2 illustrates an exemplary slot structure available in the new radio access technology (NR).

In the NR system, a slot structure illustrated in FIG. 2 may be used to minimize data transmission latency. The slot structure illustrated in FIG. 2 may also be referred to as a self-contained subframe structure.

Referring to FIG. 2, a hatched area represents a DL control region and a black area represents a UL control region. For example, the hatched area may represent a PDCCH transmission region for carrying DCI. The DCI is control information that a gNB transmits to a UE. The DCI may include, but is not limited to, information about cell configuration that the UE should know, DL specific information such as DL scheduling, and UL specific information such as UL grant. The black area may represent a PUCCH transmission region for carrying UCI. The UCI is control information that the UE transmits to the gNB. The UCI may include, but is not limited to, HARQ ACK/NACK information on DL data, CSI information about a DL channel status, and a scheduling request (SR).

In FIG. 2, an area having no mark (e.g., a symbol region from symbol index 1 to symbol index 12) may be used for transmission of a physical channel (e.g., a PDSCH) carrying DL data or may be used for transmission of a physical channel (e.g., PUCCH) carrying UL data. Referring to FIG. 2, DL transmission and UL transmission take place sequentially in one slot, and transmission/reception of DL data and reception/transmission of a UL ACK/NACK for the DL data may be performed in the one slot. Therefore, when an error is generated during data transmission, a time taken for a data retransmission may be reduced, thereby minimizing the delay of a final data transmission.

In slot structure illustrated in FIG. 2, a time gap is required to allow a gNB and a UE to switch from a transmission mode to a reception mode or from the reception mode to the transmission mode. For the switching between the transmission mode and the reception mode, some OFDM symbol corresponding to a DL-to-UL switching time is configured as a guard period (GP) in the slot structure.

In the NR system, a basic transmission unit is a slot. A slot duration includes 14 symbols each having a normal cyclic prefix (CP), or 12 symbols each having an extended CP. In addition, a slot is scaled in time by a function of a used subcarrier spacing.

For an NR system under discussion, a technique of using an ultra-high frequency band (for example, a frequency band at or above 6 GHz) is considered in order to transmit data to a plurality of users at a high transmission rate in a wide frequency band. However, the ultra-high frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time are limited to or below B although the number of beam directions is different according to connections between B TXRUs and Q antenna elements.

Figure 3:
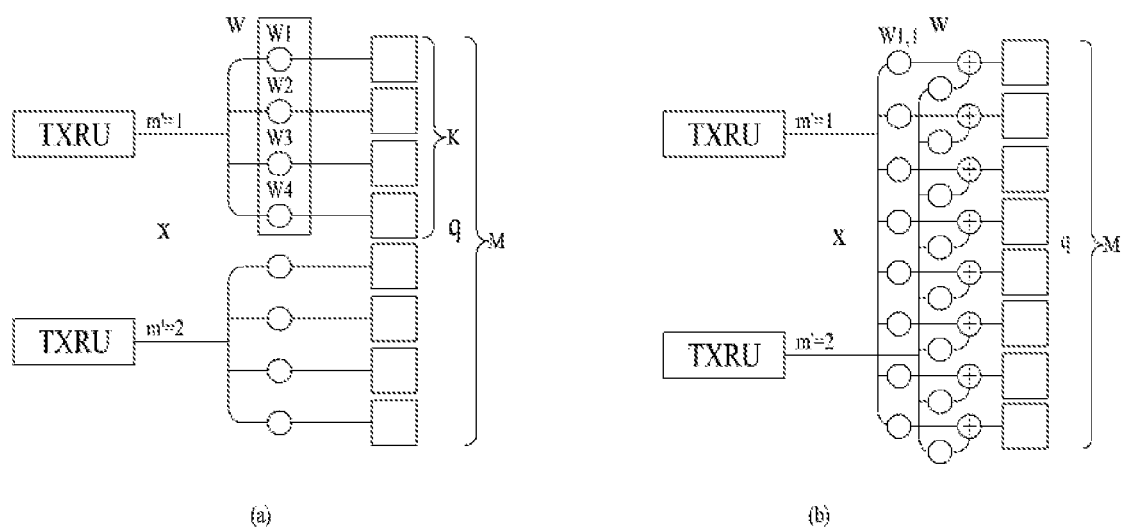
FIG. 3 is a view illustrating exemplary connection schemes between transceiver units (TXRUs) and antenna elements.

FIG. 3 is a view illustrating exemplary connection schemes between TXRUs and antenna elements.

Figure 4:
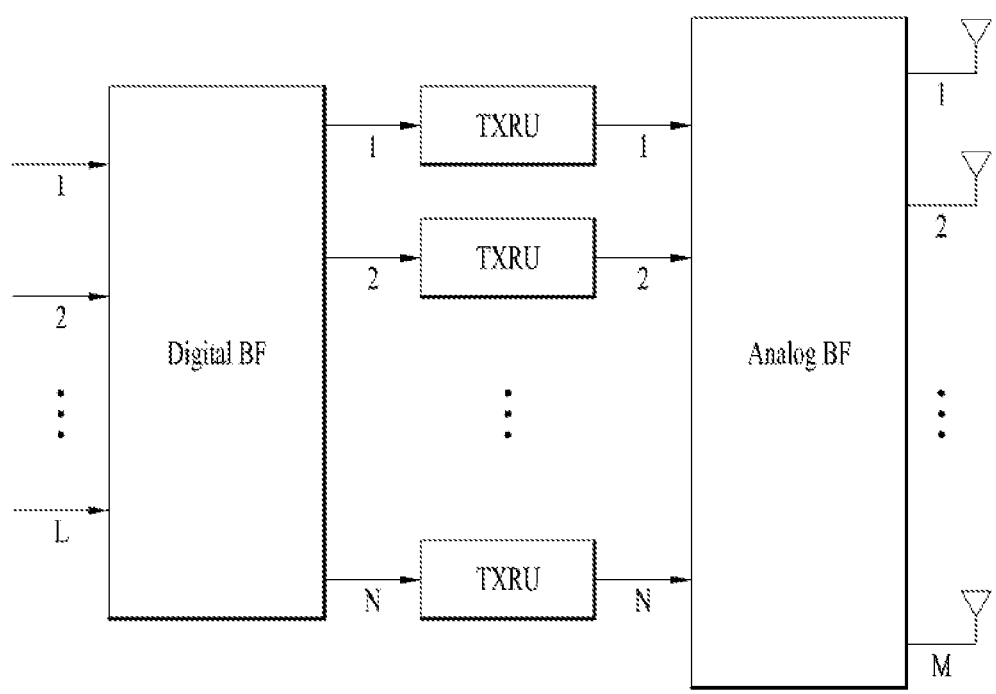
FIG. 4 is a view abstractly illustrating a hybrid beamforming structure in terms of TXRUs and physical antennas.

(a) of FIG. 3 illustrates connection between a TXRU and a sub-array. In this case, an antenna element is connected only to one TXRU. In contrast, (b) of FIG. 4 illustrates connection between a TXRU and all antenna elements. In this case, an antenna element is connected to all TXRUs. In FIG. 3, W represents a phase vector subjected to multiplication in an analog phase shifter. That is, a direction of analog beamforming is determined by W. Herein, CSI-RS antenna ports may be mapped to TXRUs in a one-to-one or one-to-many correspondence.

As mentioned before, since a digital baseband signal to be transmitted or a received digital baseband signal is subjected to a signal process in digital beamforming, a signal may be transmitted or received in or from a plurality of directions on multiple beams. In contrast, in analog beamforming, an analog signal to be transmitted or a received analog signal is subjected to beamforming in a modulated state. Thus, signals cannot be transmitted or received simultaneously in or from a plurality of directions beyond the coverage of one beam. A gNB generally communicates with multiple users at the same time, relying on the wideband transmission or multiple antenna property. If the gNB uses analog BF or hybrid BF and forms an analog beam in one beam direction, the gNB has no way other than to communicate only with users covered in the same analog beam direction in view of the nature of analog BF. A later-described RACH resource allocation and gNB resource utilization scheme according to the present disclosure is proposed by reflecting limitations caused by the nature of analog BF or hybrid BF.

FIG. 4 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix.

In FIG. 4, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered.

In the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 5:
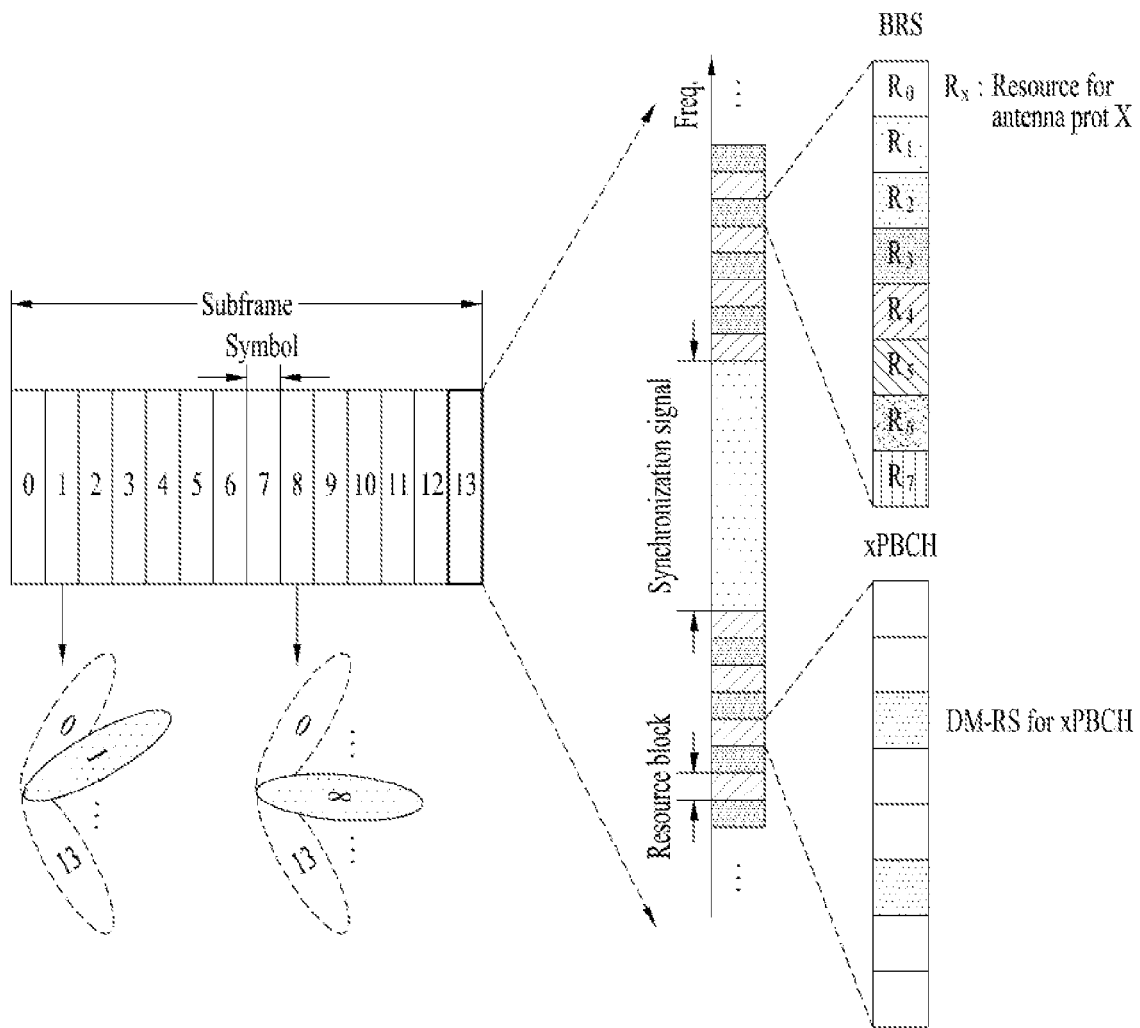
FIG. 5 illustrates a beam sweeping operation performed in a downlink signal transmission process in an NR system.

FIG. 5 illustrates a beam sweeping operation performed in a DL signal transmission process in an NR system.

Referring to FIG. 5, a process of transmitting an SS and system information is illustrated as an example of DL signal transmission. In FIG. 5, an xPBCH may mean a physical resource (or physical channel) over which system information of the NR system is broadcasted.

Analog beams belonging to different antenna panels may be simultaneously transmitted in one symbol. In this case, in order to measure a channel per analog beam, as illustrated in FIG. 5, the introduction of a beam reference signal (BRS), which is a reference signal (RS) to which a single analog beam corresponding to a specific antenna panel is applied, has been discussed. The BRS may be defined for a plurality of antenna ports and each antenna port of the BRS may correspond to a single analog beam. In this case, unlike the BRS, all analog beams in an analog beam group may be applied to the SS or xPBCH to assist a random UE in correctly receiving the SS or xPBCH.

Figure 6:
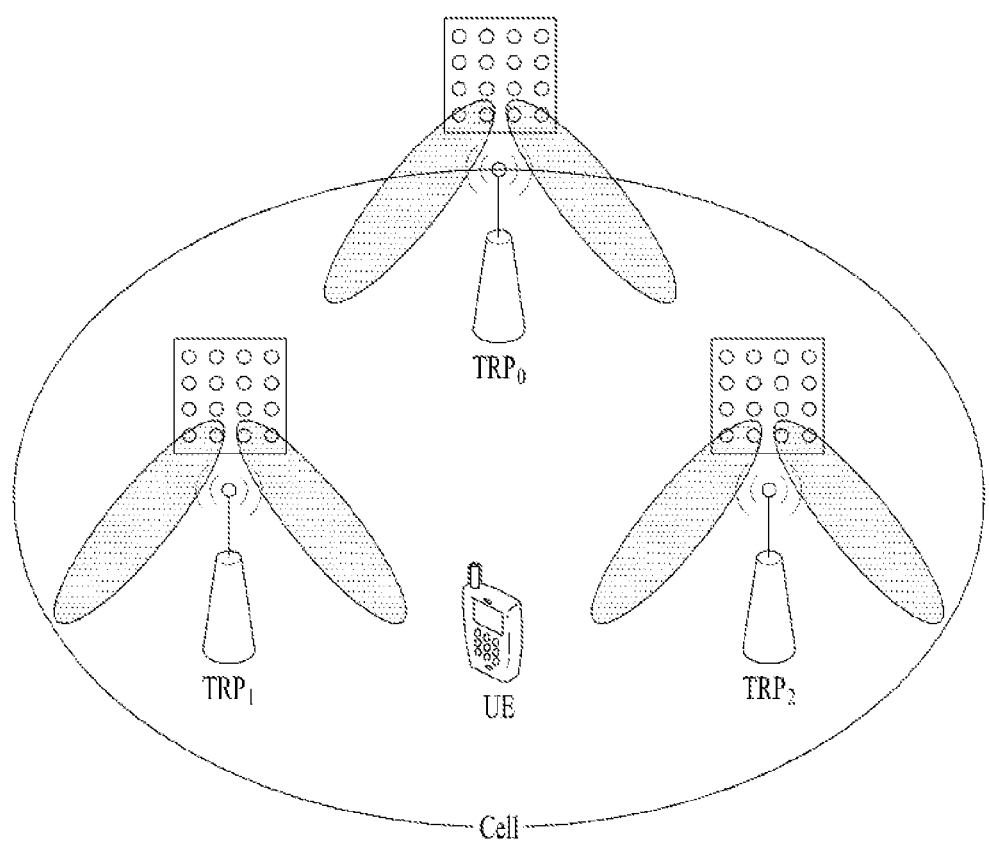
FIG. 6 is a view illustrating an exemplary cell in an NR system.

FIG. 6 is a view illustrating an exemplary cell in the NR system.

Referring to FIG. 6, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system.

Radio Resource Management (RRM) Operation of LTE System

The LTE system supports an RRM operation including power control, scheduling, cell search, cell reselection, handover, radio link or connection monitoring, and connection establishment/re-establishment. In this case, a serving cell may request that the UE send RRM measurement information corresponding to a measurement value for performing the RRM operation. For example, in the LTE system, typically, the UE may measure cell search information, reference signal received power (RSRP), reference signal received quality (RSRQ), etc., for each cell and then report the measured information to the eNB. In the LTE system, the UE receives 'measConfig' as a higher layer signal for RRM measurement from the serving cell and measures RSRP or RSRQ based on the received information of 'measConfig'. In this case, RSRP and RSRQ have been defined in the specification of TS 36.214 of the LTE system.

In the case of intra-frequency measurement, the UE operating in the LTE system may measure RSRP in bandwidth corresponding to one of 6, 15, 25, 50, 75, and 100 RBs transmitted through allowed measurement bandwidth information (e.g., AllowedMeasBandwidth information element (IE)). The allowed measurement bandwidth information may be transmitted in system information block type 3 (SIB3).

In the case of inter-frequency measurement, the UE may measure RSRP in bandwidth corresponding to one of 6, 15, 25, 50, 75, and 100 RBs transmitted through the allowed measurement bandwidth information (e.g., AllowedMeasBandwidth IE). The allowed measurement bandwidth information may be transmitted in system information block type 5 (SIB5). When the allowed measurement bandwidth information is not present, the UE may measure RSRP in the entire DL system frequency band.

Upon receiving the allowed measurement bandwidth information, the UE may regard the value of the allowed measurement bandwidth information as a maximum measurement bandwidth and freely measure RSRP within the maximum measurement bandwidth. However, if the serving cell transmits an IE defined as a wide band RSRQ (WB-RSRQ) and sets the allowed measurement bandwidth to 50 RBs or more, the UE needs to calculate RSRP for the entire allowed measurement bandwidth. Meanwhile, a received signal strength indicator (RSSI) is measured in a frequency bandwidth of a receiver of the UE according to definition of an RSSI bandwidth.

For inter-frequency or inter-RAT measurement, in the LTE system, a measurement gap for performing measurement by the UE may be defined. During the measurement gap, the UE may stop communication with the serving cell and perform inter-frequency or inter-RAT measurement.

Referring to the specification of 36.133, when the UE requires the measurement gap in order to identify and measure inter-frequency and/or inter-RAT cells, E-UTRAN should provide one measurement gap pattern having a predetermined gap duration in order to simultaneously monitor all frequency layers and RATs. Table 3 below shows gap pattern configuration supported by the UE in the LTE system.

TABLE 3

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
| --- | --- | --- | --- | --- |
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD CDMA2000 1x |

Referring to Table 3, when a gap pattern Id is 0, the UE may monitor frequencies other than frequencies of the serving cell for 6 ms in units of a 40 ms period and, when the gap pattern Id is 1, the UE may monitor frequencies other than frequencies of the serving cell for 6 ms in units of an 80 ms period. For a preset time of 6 ms, the BS may not allocate a resource to the UE or transmit traffic to the UE and the UE may search for an available frequency signal for handover by measuring frequencies other than frequencies of the serving cell. During a measurement gap interval, the UE transmits no data. In addition, during the measurement gap interval, the UE does not tune a receiver of the UE in E-UTRAN subcarriers of a primary cell (PCell) and all secondary cells (SCells) and E-UTRAN subcarriers of the PCell and a primary secondary cell (PSCell). If the measurement gap of 6 ms is ended, the UE monitors the frequencies of the serving cell again.

Neighbor Cell Detection in NR System

The NR system may support high-frequency millimeter wave (mmWave) bands. In the high frequency bands, a data channel, a control channel, an SSB, etc. may be transmitted based on beamforming for cell coverage enhancement. When a BS performs signal transmission using multiple beams, a UE may attempt to receive the data channel, control channel, and SSB. By doing so, the cell coverage enhancement may be achieved.

To enhance the cell coverage, the UE may detect a beam with the best reception quality from among a plurality of beams transmitted from the BS in an initial access procedure. In this case, the amount of received power may be used as a quality indicator in beam selection and management. When selecting the beam with the best reception quality, the UE may detect the beam with the best reception quality for each transmission beam if the UE uses multiple beams. The UE may form a pair between each transmission beam and the best reception beam thereof and use the pair to communicate with the BS. To this end, the BS may inform the UE of which transmission beam is used to transmit the data channel for transmitting data to the UE. Such information may be transmitted through the control channel.

Thus, the UE may preferentially configure a reception beam with respect to the beam on which the control channel is transmitted. Upon receiving information about the transmission beam for transmitting the data channel over the control channel, the UE may form the reception beam with the best quality with respect to the transmission beam for transmitting the data channel at a time when the UE receives the data channel.

To guarantee stable mobility in addition to communication with a serving cell, the UE may measure the reception quality of a neighbor cell and compare the reception quality of the neighbor cell with the reception quality of the serving cell. If a predetermined event is satisfied, the UE may report to the UE that the event is satisfied.

In this case, received signal received power (RSRP) may be used as the reception quality for mobility. If necessary, received signal received quality (RSRQ) may be further used. To compare the reception quality of the serving cell and the reception quality of the neighbor cell, the UE may measure the reception quality by assuming that a signal is received on the reception beam with the best quality for each cell. Based on the measured reception quality, the UE may perform inter-cell handover.

In the LTE system, since it is assumed that a UE uses a single reception beam, it is not necessary to select a reception beam with respect to a transmission beam in intra-frequency measurement. That is, since the UE performs signal reception using the same reception beam for every cell, the UE may receive a signal from a neighbor cell while receiving a signal from a serving cell or perform measurement for multiple signals. Therefore, in the LTE system, the serving cell may not need to stop transmission of data and control channels while the UE measures the reception quality of the neighbor cell. The UE may perform the intra-frequency periodically in the LTE system.

However, if the UE uses multiple beams as in the NR system, the UE may form a reception beam with respect to a transmission beam of the serving cell when receiving the data and control channels from the serving cell. Thus, since the UE measures the reception quality of the neighbor cell using the reception beam formed with respect to the transmission beam of the serving cell, it may be difficult to accurately compare the reception quality of the serving cell and the reception quality of the neighbor cell. Therefore, in the NR system, a UE detects reception beams suitable for one or more neighbor cells to measure the reception quality of the neighbor cells. In this case, since the UE cannot know which beams are suitable for the neighbor cells, the UE may detect the reception beam suitable each of the one or more neighbor cells by performing beam sweeping. However, when the UE forms the reception beam with respect to the neighbor cell and then measures the reception quality of the neighbor cell based on the reception beam formed with respect to the neighbor cell, the reception quality of data and control channels transmitted from a serving cell may be significantly degraded.

PROPOSED EMBODIMENTS

In contrast to the LTE system, no common reference signal (C-RS) is defined in the NR system. Thus, a method of measuring the reception quality of a neighbor cell based on an SSB, which includes an SS and a PBCH, and a CSI-RS has been considered in the NR system, instead of measuring the reception quality of the neighbor cell based on the C-RS. In the NR system, the SSB may be configured to be transmitted with various periodicities to support various operation methods for a BS, unlike the LTE system where the SSB is transmitted with the same periodicity.

In the LTE system, one cell may transmit one SS in one frequency band (in this case, a bandwidth of 1.4 to 20 MHz may be configured). However, the NR system may use an SS and a C-RS connected to the SS as a signal for representing one cell. Thus, when a UE is simultaneously configured with a plurality of frequency bands as in carrier aggregation, the UE may recognize that SSs and C-RSs transmitted on multiple carriers are for different cells and perform independent measurement for each carrier. In this case, the measurement may refer to RSRP/RSRQ measurement for mobility support. Since each carrier corresponds to a serving cell, the UE may perform the intra-frequency measurement multiple times.

Compared to the LTE system, a wideband carrier has been introduced to the NR system. In the NR system, the BS may configure a wide frequency band, but each UE may not support the entirety of the wide frequency band configured by the BS. The UE may perform communication in a part of the frequency band configured by the BS. The partial frequency band where the UE performs the communication may be referred to as a bandwidth part (BWP). The BS may simultaneously configure a plurality of BWPs for the UE and activate at least one BWP from among the plurality of configured BWPs. Herein, an activated BWP may be referred to as an active BWP.

In the NR system, since a signal is transmitted in a wide frequency band, one SSB for supporting mobility and initial access may be transmitted for overhead reduction. However, in a system where many narrowband UEs operate, multiple UEs may be uniformly distributed in the whole frequency bands to perform load balancing of the frequency bands, and multiple SSBs may be located in the whole frequency bands to support mobility in each frequency band. When multiple SSBs are transmitted, the UE may access the system and perform the measurement for mobility support based on each SSB. However, the UE may not know whether SSBs transmitted at different frequencies in the wideband are transmitted from the same cell or different cells. For example, in the LTE CA system, as if each carrier (or an SS and a C-RS transmitted on each CC) represents a different cell, the UE may set an SSB transmitted on a carrier that is designated in a call configuration process or designated by the UE in an initial access procedure to a cell-defining SSB. In addition, the UE may set an SSB transmitted on other carriers except the cell-defining SSB to a non-cell-defining SSB. In this case, the cell-defining SSB and non-cell-defining SSB may be determined from the perspective of the UE. The UE may regard a cell detected from the non-cell-defining SSB as a non-serving cell. Even when there are a plurality of SSBs in an active BWP, the UE may regard only measurement for a frequency band in which the cell-defining SSB is transmitted as the intra-frequency measurement. In addition, the UE may regard mobility measurement for a frequency band in which the non-cell-defining SSB is transmitted as inter-frequency measurement.

To discuss problems in the above-described system, two scenarios may be considered. The UE may be configured with a plurality of BWPs, which are located at different frequencies and have various bandwidths, per service or for load balancing. If necessary, the UE may activate one BWP from among the plurality of configured BWPs. In this case, considering the efficiency of a measurement configuration, the BS may configure the measurement configuration such that the UE measures the frequency location of an SSB in each BWP. For example, the BS may transmit, to the UE, a measurement configuration message containing information required for the UE to measure the frequency location of the SSB in each BWP.

The measurement configuration may be performed through a measurement object. For example, the measurement configuration message may include measurement object information, and the measurement object information may include information on a target that the UE needs to measure. Table 4 below shows an example of defining the measurement object information in the LTE system, and Table 5 below shows an example of defining the measurement object information in the NR system.

TABLE 4

```
MeasObjectEUTRA ::=    SEQUENCE {
   carrierFreq              ARFCN-ValueEUTRA,
   allowedMeasBandwdith     AllowedMeasBandwidth,
   presenceAntennaPort1     PresenceAntennaPort1,
   neighCellConfig          NeighCellConfig,
   offsetFreq               Q-OffsetRange          DEFAULT dB0,
   -- Cell list
   cellsToRemoveList        CellIndexList          OPTIONAL,    -- Need ON
   eellsToAddModList        CellsToAddModList      OPTIONAL,    -- Need ON
   -- Black list
   blackCellsToRemoveList   CellIndexList          OPTIONAL,    -- Need ON
   blackCellsToAddModList   BlackCellsToAddModList OPTIONAL,    -- Need ON
   cellForWhichToReportCGI  PhysCellId             OPTIONAL,    -- Need ON
   ...,
```

TABLE 5

```
MeasObjectEUTRA ::=  SEQUENCE {
   ssbFrequency            ARFCN-ValueNR          OPTIONAL, -- Cond SSBorAssociatedSSB
   ssbSubcarrierSpacing    SubcarrierSpacing      OPTIONAL, -- Cond SSBorAssociatedSSB
   smtc1                   SSB-MTC                OPTIONAL, -- Cond SSBorAssociatedSSB
   smtc2                   SSB-MTC2               OPTIONAL, -- Cond IntraFreqConnected
   refFreqCSI-RS           ARFCN-ValueNR
   referencesSignalConfig  ReferenceSignalConfig,
```

For each measurement object, one carrier frequency may be configured by assuming a different cell for each frequency location of the SSB. However, when each carrier frequency is configured by assuming different cells depending on the frequency location of the SSB even though all SSBs are actually transmitted in one cell, the UE should measure SSBs corresponding to all carrier frequencies. Further, the UE needs to perform the inter-frequency measurement for SSBs except the cell-defining SSB among all SSBs. As a result, the UE may unnecessarily perform the inter-frequency measurement without reflecting an actual management scenario, thereby increasing the power consumption of the UE or degrading the throughput.

To solve the aforementioned problem, a radio resource control (RRC) reconfiguration method may be considered to change the cell-defining SSB and the measurement object whenever the frequency of the active BWP changes. However, the RRC reconfiguration method is not suitable when the BS rapidly changes the BWP as needed.

To prevent the inter-frequency measurement from being performed unnecessarily, it may be considered that the inter-frequency measurement is performed based on the quality of the serving cell. The inter-frequency measurement based on the quality of the serving cell may correspond to s-measure in the LTE system. However, when there is no cell-defining SSB in the active BWP even though the non-cell defining SSB is present in the active BWP, the UE needs to perform RF tuning for the intra-frequency measurement. To this end, the BS needs to configure a measurement gap for the intra-frequency measurement. Service interruption may occur in the measurement gap.

In addition, since the UE is unable to perform RSRP measurement for power control, frequency offset measurement for automatic frequency control (AFC), and path profile measurement for system time tracking, additional RS transmission is required.

To solve the above-described problem, the BS may inform the UE that when a plurality of SSBs are transmitted in a wideband component carrier (CC), the plurality of SSBs are transmitted from the same cell. To solve the problems in terms of mobility measurement, the present disclosure proposes a method of configuring a plurality of carrier frequencies in a measurement object.

When one cell operates as a wideband CC and a plurality of SSBs are transmitted on the wideband CC, the BS may configure for the UE all frequencies at which the plurality of SSBs are transmitted or some frequencies required for management through the measurement object information. Here, the frequency may refer to the carrier frequency. For example, when a plurality of carrier frequencies configured in the measurement object are within the active BWP, the UE may determine that SSBs transmitted at the carrier frequencies configured in the measurement object are transmitted from the same cell and then measure as many SSBs as the UE needs. For example, the measurement object information may include information on a plurality of carrier carriers on which SSBs are transmitted. In this case, the UE may determine that the SSBs received on the carrier carriers included in the measurement object information are transmitted from the same cell and then measure the signal quality of the corresponding cell based on the received SSBs.

To output representative RSRP for the same cell ID, the UE may combine RSRPs detected from SSBs. For example, the UE may calculate an average or a maximum value of the RSRPs detected from the SSBs for each cell. The RSRPs detected from the SSBs may be combined in an L1 average step or an L3 average step.

In contrast to the above description, although there is no cell-defining SSB within the active BWP, an SSB transmitted at a carrier frequency additionally configured in the measurement object including the cell-defining SSB may be present within the active BWP. When it is said that an SSB exists in the active BWP, it may mean that a carrier frequency at which the SSB is transmitted is within the active BWP. In this case, the UE may assume that the SSB in the active BWP is transmitted on the same cell as a cell on which the cell-defining SSB is transmitted and recognize the SSB in the active BWP as an SSB for substituting the SSB in the active BWP. For example, the UE may check information on the frequency band of a currently configured active BWP and information on the frequency band of an SSB transmitted at a frequency configured in the measurement object. When the active BWP includes the SSB, the UE may configure no measurement gap for the intra-frequency measurement. Instead, the UE may use the measurement result obtained from the SSB included in the active BWP as the measurement result for the cell-defining SSB. In this case, if the active BWP is changed and the changed BWP includes an SSB in the same measurement object, the UE may use the measurement result obtained from a previous SSB and the measurement result obtained from a newly configured SSB to measure RSRP for each cell although an SSB to be used for measurement is changed. Accordingly, even though the SSB is changed, the UE may perform the same filtering for L1 and L3 filtering.

In some embodiments, the UE may use the above-described configuration information for frequency offset measurement, measurement for time tracking, and path loss estimation as well as the mobility measurement.

Figure 7:
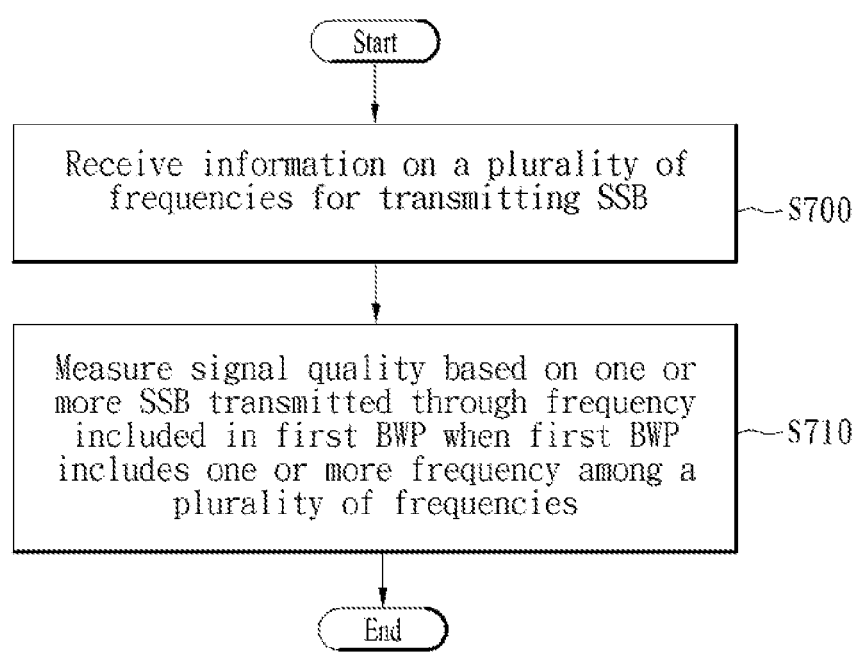
FIG. 7 is a flowchart illustrating a method for a communication device to measure signal quality according to the present disclosure.

FIG. 7 is a flowchart illustrating a method for a communication device to measure signal quality according to the present disclosure.

Referring to FIG. 7, in S700, the communication device according to an embodiment of the present disclosure may receive information on a plurality of frequencies for SSB transmission. As described above, in the NR system, a plurality of SSBs may be transmitted at different frequencies, and thus a BS may transmit information on frequencies for transmitting the plurality of SSBs to the communication device. For example, the BS may transmit to the communication device an RRC configuration message including measurement object information, and the measurement object information may include the information on the frequencies for transmitting the plurality of SSBs. In addition, the measurement object information may include information on a target that the communication device needs to measure as well as the information on the frequencies for transmitting the plurality of SSBs.

In S710, when a first BWP among a plurality of BWPs configured for the communication device is activated and the first BWP includes one or more frequencies among the plurality of frequencies, the communication device may measure the signal quality based on one or more SSBs transmitted at the frequencies included in the first BWP among the plurality of frequencies. For example, assuming that the measurement object information includes frequencies (e.g., $f_0$, $f_1$, $f_2$, $f_3$) for transmitting the plurality of SSBs and the activated first BWP includes frequencies $f_0$ and $f_1$, the communication device may measure the signal quality based on at least one of SSBs transmitted at frequencies $f_0$ and $f_1$. For example, the communication device may measure either or both RSRP and RSRQ based on an SSB transmitted on at least one of frequencies $f_0$ and $f_1$.

In addition, the communication device may obtain one value representing the signal quality of one cell by combining signal quality values measured based on the SSB transmitted on at least one of frequencies $f_0$ and $f_1$. For example, when the signal quality is measured based on SSBs transmitted at frequencies $f_0$ and $f_1$, the obtained value may include an average or a maximum value of measurements obtained based on the SSBs transmitted at frequencies $f_0$ and $f_1$. However, the present disclosure is not limited thereto.

When the active BWP is switched from the first BWP to a second BWP and the second BWP includes at least one (e.g., $f_2$) of the frequencies included in the measurement object information, the measurement result obtained from the SSB transmitted at frequency $f_0$ or $f_1$ and the measurement result obtained from an SSB transmitted at frequency $f_2$ may be determined as the measurement result obtained from an SSB transmitted at the same frequency. In some embodiments, among the frequencies configured by the measurement object information, the frequencies included in the second BWP may include the frequencies included in the first BWP.

Figure 8:
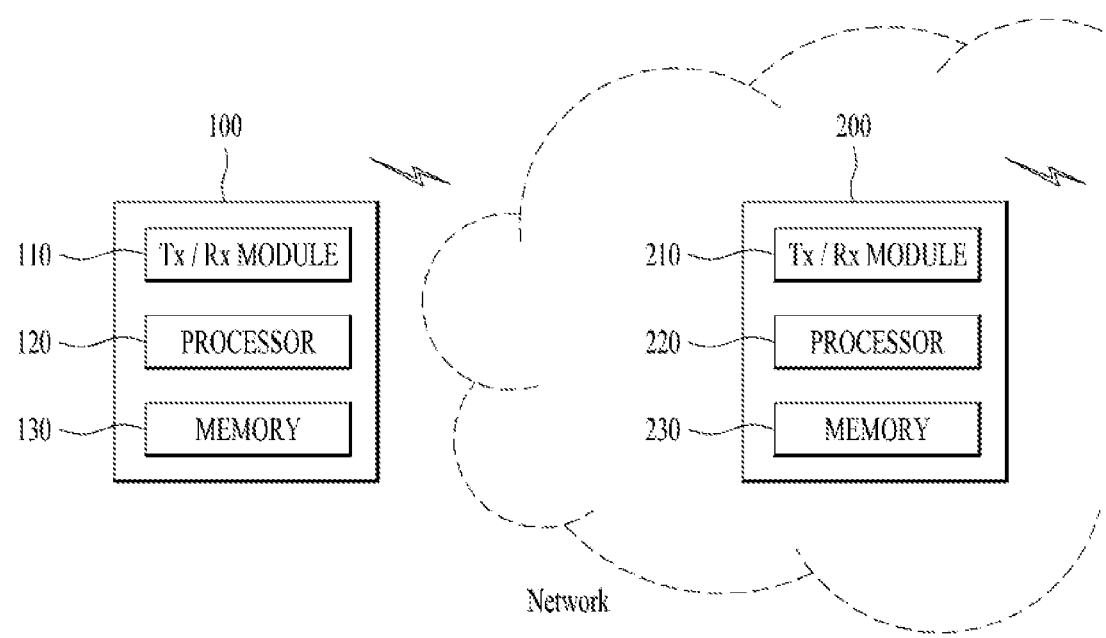
FIG. 8 is a diagram illustrating the configurations of a communication device and a BS according to the present disclosure.

FIG. 8 is a diagram illustrating the configurations of a communication device and a BS according to the present disclosure.

The communication device 100 according to a proposed embodiment may include a processor 110 and a memory 120. For example, the communication device 100 may correspond to the UE described above in FIGS. 1 to 7. The communication device 100 may be connected to an external device by wire and/or wirelessly.

The processor 110 may be configured to control the overall operations of the communication device 100 and process information exchanged between the communication device 100 and the external device. In addition, the processor 110 may be configured to perform the operations of the communication device 100 proposed in the present disclosure. The processor 110 may be configured to control the communication device 100 to transmit data or messages according to the proposals of the present disclosure.

The memory 120 may be configured to store the processed information for a predetermined time and replaced with a component such as a buffer (not shown in the drawing).

In some embodiments, the communication device 100 may further include a transceiver (not shown in the drawing). The transceiver may be referred to as a radio frequency (RF) unit or a transmitting and receiving module. The transceiver may be configured to exchange various signals, data, and information with the external device. The transceiver may be divided into a transmitter and a receiver.

Referring to FIG. 8, the BS 200 according to a proposed embodiment may include a transceiver 210, a processor 220, and a memory 230. The BS 200 may be connected to an external device by wire and/or wirelessly. In an access network, the BS may be an eNB or a gNB.

In case of communication with the communication device 100, the transceiver 210 may be referred to as a transmitting and receiving module or an RF unit. The transceiver 210 may be configured to exchange various signals, data, and information with the external device. The transceiver 210 may be divided into a transmitter and a receiver.

The processor 220 may be configured to control the overall operations of the BS 200 and process information exchanged between the BS 200 and the external device. In addition, the processor 220 may be configured to perform the operations of the BS 200 proposed in the present disclosure. The processor 220 may be configured to control the transceiver 210 to transmit data or messages to the communication device 100 or another BS according to the proposals of the present disclosure.

The memory 230 may be configured to store the processed information for a predetermined time and replaced with a component such as a buffer (not shown in the drawing).

The configurations of the communication device 100 and the BS 200 may be implemented such that each of the embodiments of the present disclosure is independently applied or two or more embodiments are simultaneously applied. Redundant descriptions are omitted for clarity.

The embodiments of the present disclosure may be implemented through various means. For example, the embodiments may be implemented by hardware, firmware, software, or a combination thereof.

When implemented by hardware, a method according to embodiments of the present disclosure may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, the method according to the embodiments of the present disclosure may be implemented by modules, procedures, and/or functions for performing the above-described functions or operations.

Software code may be stored in a memory unit and executed by a processor. The memory unit may be provided within or outside the processor and exchange data with the processor through various means known to the public.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described communication method is applicable to various wireless communication systems including not only IEEE 802.16x and IEEE 802.11x systems as well as the 3GPP LTE system. Further, the proposed method is also applicable to a mmWave communication system using ultra-high frequency bands.

The invention claimed is:

1. A method performing a radio resource management (RRM) measurement by a user equipment (UE) in a wireless communication system, the method comprising:
   receiving, from a base station (BS), configuration information for configuring a plurality of bandwidth parts (BWPs) for the UE;
   receiving, from a base station (BS), measurement object information for the RRM measurement,
   wherein the measurement object information includes information about a plurality of frequencies for a plurality of synchronization signal blocks (SSBs);
   receiving, from the BS, a SSB based on the measurement object information in a first BWP activated among the plurality of BWPs;
   performing the RRM measurement based on the received SSB; and
   reporting, to the B S, a result of the RRM measurement,
   wherein the SSB is transmitted at a frequency included in the first BWP among the plurality of frequencies configured by the measurement object information, and
   wherein, based on the first BWP including two or more frequencies among the plurality of frequencies, SSBs transmitted at the two or more frequencies are determined to be transmitted at a same frequency.

2. The method of claim 1, wherein the measurement object information is received through a radio resource control (RRC) configuration message.

3. The method of claim 1,
   wherein the performing the RRM measurement comprises measuring at least one of reference signal received power (RSRP) or reference signal received quality (RSRQ) based on the at least one SSB transmitted at the frequency included in the first BWP.

4. The method of claim 1,
   a BWP activated for the UE communication device is being switched from the first BWP to a second BWP, a first measurement result based on an SSB transmitted at a first frequency included in the first BWP among the plurality of frequencies and a second measurement result based on the SSB transmitted at a second frequency included in the second BWP among the plurality of frequencies are determined to be measured based on an SSB transmitted at the same frequency.

5. The method of claim 1,
wherein the performing the RRM measurement comprises obtaining a value representing signal quality by combining signal quality values based on the RRM measurement.

6. The method of claim 5,
wherein the value representing the signal quality includes an average or a maximum value of the signal quality values based on the RRM measurement.

7. A user equipment (UE) for performing a radio resource management (RRM) measurement in a wireless communication system, the communication device comprising:
a memory; and
a processor,
wherein the processor is configured to:
receive, from a base station (BS), configuration information for configuring a plurality of bandwidth parts (BWPs) for the UE;
receive, from a base station (BS), measurement object information for the RRM measurement,
wherein the measurement object information includes information about a plurality of frequencies for a plurality of synchronization signal blocks (SSBs);
receive, from the BS, a SSB based on the measurement object information in a first BWP activated among the plurality of BWPs; and
perform the RRM measurement based on the received SSB; and
report, to the BS, a result of the RRM measurement,
wherein the SSB is transmitted at a frequency included in the first BWP among the plurality of frequencies configured by the measurement object information, and
wherein, based on the first BWP including two or more frequencies among the plurality of frequencies, SSBs transmitted at the two or more frequencies are determined to be transmitted at a same frequency.

8. The UE of claim 7, wherein the measurement object information is received through a radio resource control (RRC) configuration message.

9. The UE of claim 7,
wherein the processor is configured to measure at least one of reference signal received power (RSRP) or reference signal received quality (RSRQ) based on the SSB transmitted at the frequency included in the first BWP.

10. The UE of claim 7,
in response to a BWP activated for the UE being switched from the first BWP to a second BWP, a first measurement result based on a SSB transmitted at a first frequency included in the first BWP among the plurality of frequencies and a second measurement result based on a SSB transmitted at a second frequency included in the second BWP among the plurality of frequencies are determined to be measured based on an SSB transmitted at the same frequency.

11. The UE of claim 7, wherein the processor is further configured to obtain a value representing signal quality by combining signal quality values based on the RRM measurement.

12. The UE of claim 11, wherein the value representing the signal quality includes an average or a maximum value of the signal quality values based on the RRM measurement.

* * * * *